S. F. BOYCE.
VEHICLE BRAKE.
APPLICATION FILED DEC. 21, 1908.
951,174.
Patented Mar. 8, 1910.
2 SHEETS—SHEET 1.
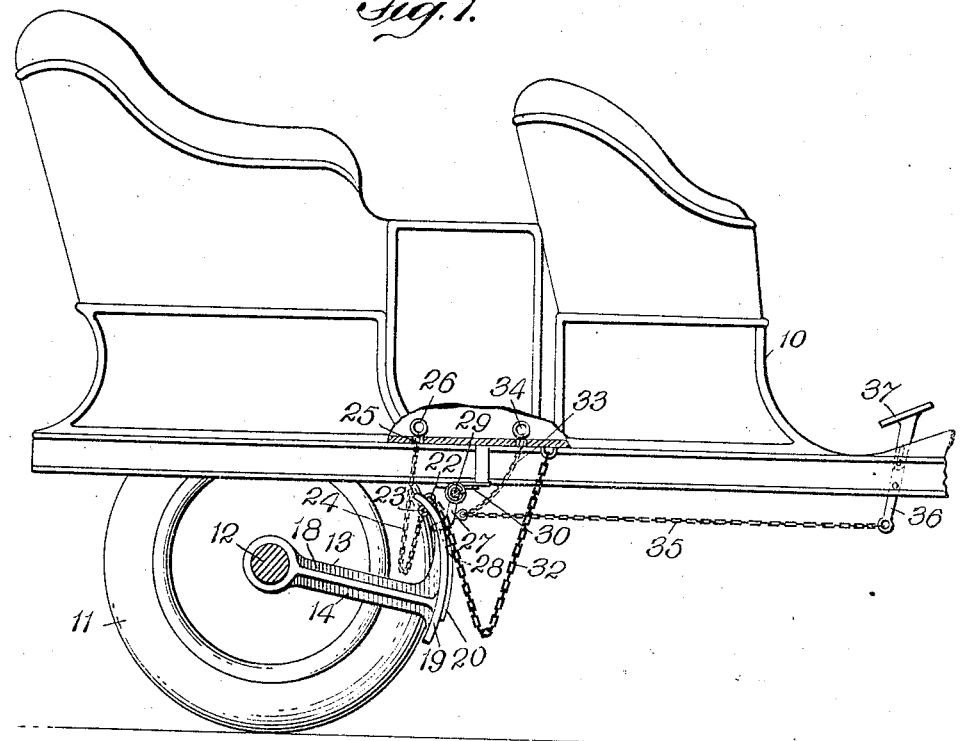
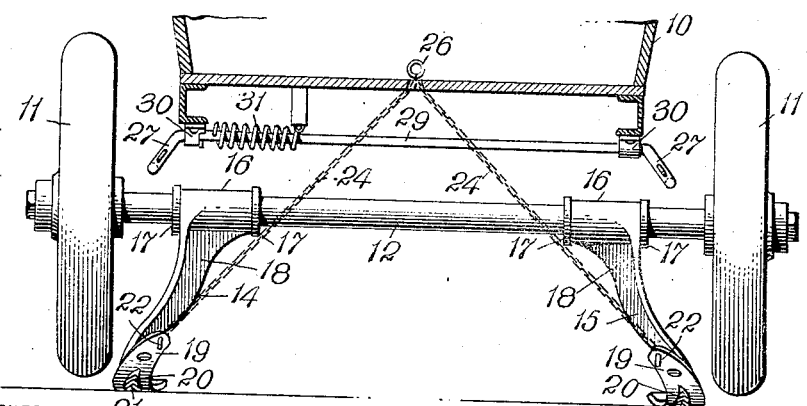
WITNESSES
INVENTOR
Samuel F. Boyce
BY
Criswell & Criswell
ATTORNEYS

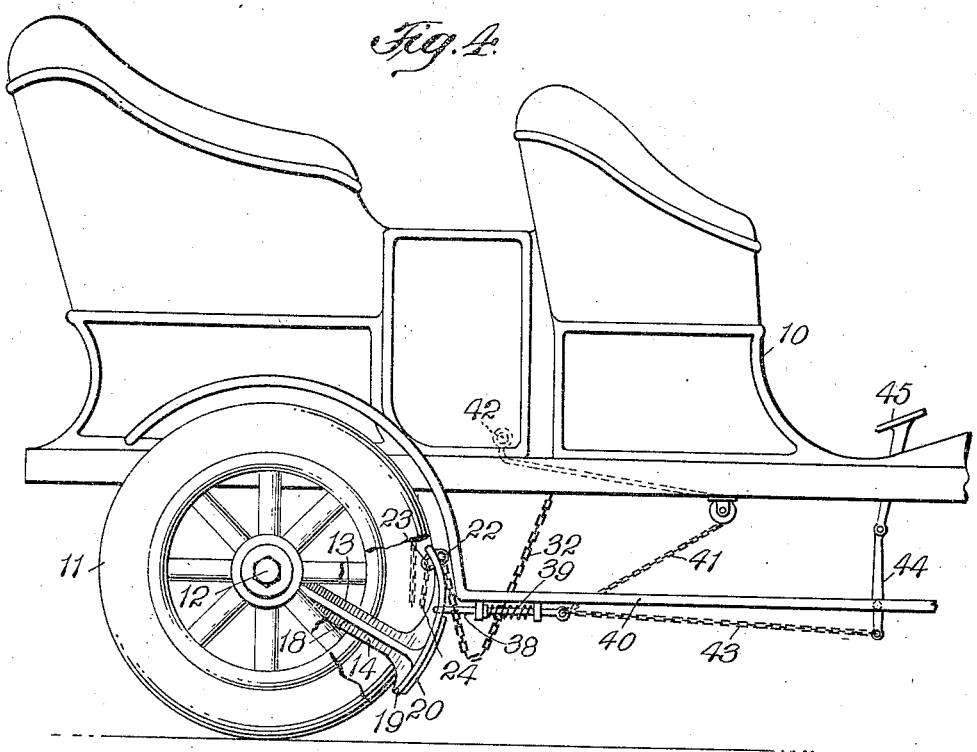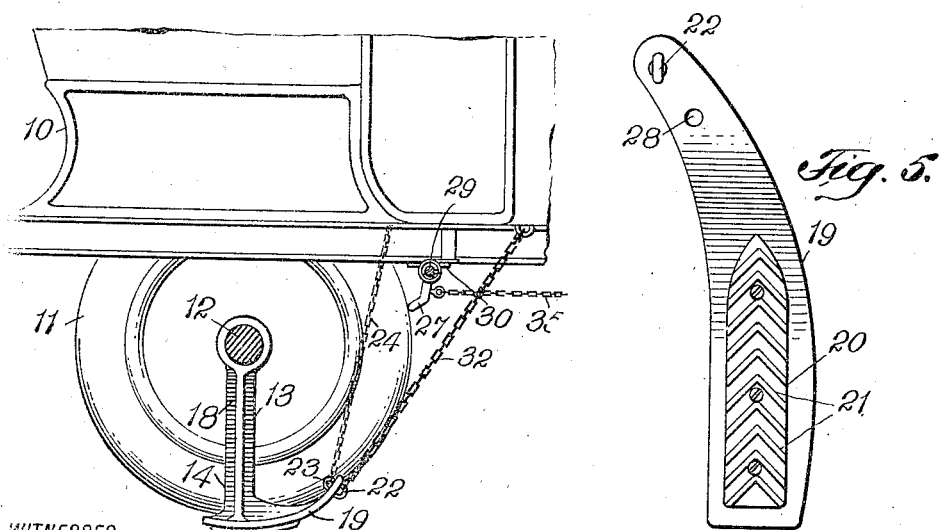

UNITED STATES PATENT OFFICE.

SAMUEL F. BOYCE, OF SCHENECTADY, NEW YORK, ASSIGNOR OF ONE-HALF TO ROBERT E. POWELL, OF NEW YORK, N. Y.

VEHICLE-BRAKE.

951,174.  Specification of Letters Patent.  Patented Mar. 8, 1910.

Application filed December 21, 1908. Serial No. 468,617.

*To all whom it may concern:*

Be it known that I, SAMUEL F. BOYCE, a citizen of the United States, and a resident of Schenectady, county of Schenectady, and State of New York, have invented certain new and useful Improvements in Vehicle-Brakes, of which the following is a full, clear, and exact description.

This invention relates more particularly to emergency brakes for automobiles.

The primary object of the invention is to provide simple and efficient means whereby in case there is likely to be an accident or for other reasons, an emergency brake may be quickly applied in such a way as to raise the driving wheels of the vehicle from off the ground, thus permitting the engine or motor to rotate the driving axle and wheels of the vehicle without any propelling effect, and to so construct the braking means that it will automatically raise the vehicle wheels when the same is released and assist in stopping the vehicle much more quickly and readily than can be accomplished by the brakes as ordinarily constructed.

Another object of the invention is to provide simple and efficient brake mechanism which may be applied to various forms of vehicles and which may be used for various purposes.

A further object of the invention is to provide a brake mechanism which may be easily and properly controlled; and to provide means whereby the mechanism may be placed in operative position from both the rear and the front of the vehicle.

With these and other objects in view, the invention will be hereinafter more particularly described with reference to the accompanying drawings which form a part of this specification, and will then be pointed out in the claims at the end of the description.

In the drawings, Figure 1 is a fragmentary view, partly in section, of an automobile with one form of my invention applied thereto. Fig. 2 is a fragmentary vertical transverse section showing the brake mechanism applied to raise the rear wheels of the vehicle. Fig. 3 is a fragmentary longitudinal section, partly in elevation, showing the position of the brake mechanism when applied in emergency cases. Fig. 4 is a fragmentary side elevation, partly broken away, showing a slightly different form of means for releasing the brake members; and Fig. 5 is a detail plan of the under side of the wearing surface of one of the brake members.

The vehicle 10 may be of any suitable nature, and may be supported by the wheels 11, and said wheels may be held to an axle 12 which may be driven by an engine or other motor in the usual or in any preferred way, though it will be understood that said axle 12 need not necessarily be positively driven as the invention is applicable to either or both axles of various kind and character of vehicles.

The brake mechanism 13 may comprise two members 14 and 15, and said mechanism may be supplemental to the usual brake mechanism or may be used instead thereof if desired. As shown each of the members 14 and 15 is provided with a hub portion 16 which is held to move about or oscillate on the axle 12, and to prevent lateral movement of said members 14 and 15, the said axle 12 may be provided with collars or parts 17 located on opposite sides of the hub portion 16. An arm 18 projects outward from the hub portion 16, and this arm may be constructed to secure the desired strength, and on the outer end of said arm is an elongated shoe 19 which may be secured to or formed integral with the arm 18 of the brake member. Each shoe or enlarged engaging part 19 serves in a measure as a runner as well as for raising the vehicle, and each shoe may have its forward part curved so as to extend upward and inward, and on the under side thereof may be provided with a wearing surface or part 20. This part 20 may provide an extended wearing surface and may be of any suitable material, and said part normally lies parallel with the inner face of the vehicle wheel. Each wearing surface or part 20 may be provided with V-shaped teeth 21 which are adapted to engage the ground or other surface, and to hold more firmly thereto when the braking members are in a position shown in Figs. 2 and 3. These braking members are normally held away from the ground, and when released their weight will cause them to lower by gravity and engage the ground, and as the vehicle advances will raise the wheels so that if the latter are positively driven the motor may continue to rotate the wheels without any propelling effect whatever and by reason of the nature of the brake members the vehicle will come to a quick stop.

To raise the brake members and to hold the same in an elevated position various means may be employed. In Figs. 1, 2 and 3, the forward end of each shoe 19 is provided with eyes 22 and 23 on opposite faces thereof, and connected to the eye 23 is one end of a chain 24, the other end of which chain passes through an opening in the body of the vehicle, as at 25, and on said end of the chain is a ring or handle 26 which connects the two chains together so that by pulling on the eye or handle 26 both brake members may be raised, and when in an elevated position may be engaged by the ends of arms 27 which are adapted to enter apertures 28 formed in the ends of the shoes 19. The arms 27 are formed as a part of or secured to a rod 29, and this rod 29 is held to rock in bearings 30 on the vehicle frame, and is normally forced in one direction by a spring 31, Fig. 2, so that the ends of the arms 27 will tend normally to engage the apertures 28 of the brake members, the downward movement of the brake members being limited by a chain 32, one end of which is secured to the eye 22 or other part of the shoe, and its other end is held to the vehicle body. By this means the movement of each brake member is limited by a chain 32 which is of sufficient strength to hold the shoe, when engaging the ground, in its proper position, and by means of the chains 24 the shoes may be raised above the ground to permit the vehicle to be propelled in the usual way; it being understood that the brake members may be rigidly connected together instead of being independent as shown if preferred.

The rod 29 may be rocked to release the ends of the arms 27 from the shoes of the brake members from one or more parts of the vehicle. A chain 33 is held at one end to one of the arms 27, and its other end may be passed through the vehicle body and provided with a ring or handle 34, whereby the rod may be rocked to release the arms from the brake shoes; and to secure the same result from the front of the vehicle a chain 35 may be secured at one end to one of the arms 27 and its other end connected to a lever 36 which may be operated by a treadle 37, so that, in case there is likely to be an accident, the brake members may be quickly released and the shoes permitted to be moved by gravity to engage the ground, the latter being so constructed and arranged that the vehicle as it advances will force the shoes rearward and thus raise the vehicle wheels from the ground and at the same time stop the vehicle.

In Fig. 4 a slightly different form of means for holding and releasing each brake member is shown. A slide bolt 38, one for each member is normally forced in one direction by a spring 39, and is held under one of the guards 40 located on opposite sides of the vehicle. Each of the bolts 38 is connected by a chain 41, and these chains 41 may be connected to an operating ring or handle 42 located within the vehicle, and extending forward from each of the bolts is a chain 43 which are adapted to be operated by a lever 44, and this lever 44 may be operated by a treadle 45, so that both bolts 38 may be moved either from the front of the vehicle or from the rear thereof.

From the foregoing it will be seen that simple and efficient means are provided whereby the vehicle wheels may be quickly raised above the ground; that by constructing the brake mechanism in the manner shown the said mechanism may be quickly applied for emergency or for other purposes to stop the vehicle; that the means shown is simple in construction and may be readily applied to various forms of vehicles, and that simple means are provided whereby the brake mechanism may be held in an operative position or released to engage the ground and elevate the wheels of the vehicle to quickly stop the same.

Having thus described my invention, I claim as new and desire to secure by Letters Patent:—

1. The combination with an axle of an arm pivotally mounted thereon and provided with an elongated brake shoe, constructed to engage the ground, means for raising said shoe into inoperative position, a spring pressed rod having its end constructed to engage said shoe, and means for moving said rod out of engagement with said shoe.

2. The combination with an axle of an arm pivotally mounted thereon and provided with an elongated brake shoe, constructed to engage the ground, means for raising said shoe, a spring controlled rock shaft having one end constructed to engage said shoe when raised, and means for rocking said rock shaft to disengage said shoe.

This specification signed and witnessed this 18th day of December A. D. 1908.

SAMUEL F. BOYCE.

Witnesses:
W. A. TOWNER, Jr.,
E. KRAMER.